United States Patent
Gilbert et al.

(10) Patent No.: US 9,053,460 B2
(45) Date of Patent: *Jun. 9, 2015

(54) RULE MANAGEMENT USING A CONFIGURATION DATABASE

(75) Inventors: Allen M. Gilbert, Austin, TX (US); David L. Kaminsky, Chapel Hill, NC (US); A. Steven Krantz, Sherman Oaks, CA (US)

(73) Assignee: International Business Machines Corporation, Armonk, NY (US)

(*) Notice: Subject to any disclaimer, the term of this patent is extended or adjusted under 35 U.S.C. 154(b) by 1773 days.

This patent is subject to a terminal disclaimer.

(21) Appl. No.: 11/451,023

(22) Filed: Jun. 12, 2006

(65) Prior Publication Data

US 2007/0288280 A1   Dec. 13, 2007

(51) Int. Cl.
*G06Q 10/10* (2012.01)
*G06Q 10/06* (2012.01)
*G06F 21/55* (2013.01)
*G06F 21/62* (2013.01)
(Continued)

(52) U.S. Cl.
CPC .......... *G06Q 10/107* (2013.01); *G06Q 10/063* (2013.01); *G06F 21/554* (2013.01); *G06F 21/6218* (2013.01); *G06F 2221/2101* (2013.01); *G06F 2221/2141* (2013.01); *G06Q 50/188* (2013.01); *H04L 63/0227* (2013.01); *H04L 63/0272* (2013.01)

(58) Field of Classification Search
CPC ..................................................... G06Q 10/063
USPC ..................................................... 705/7, 7.11
See application file for complete search history.

(56) References Cited

U.S. PATENT DOCUMENTS 5,133,063 A * 7/1992 Naito et al. ..................... 703/13
7,552,145 B1 * 6/2009 Errigo et al. ..................... 1/1
(Continued)

FOREIGN PATENT DOCUMENTS

WO    WO 2004/021107 A2 *   3/2004

OTHER PUBLICATIONS

"IBM to Ease Middleware Integration With New Tivoli Tool; Later This Year, IBM Plans to Release a Repository That Will Ultimately Provide Tighter Integration Between Tivoli, Rational, WebSphere, and DB2 Software." Information Week, p. NA, May 17, 2005.*

(Continued)

*Primary Examiner* — Susanna M Meinecke Diaz
(74) *Attorney, Agent, or Firm* — Law Office of Jim Boice (57) ABSTRACT

A Configuration Management DataBase (CMDB) is utilized when determining if resources, which are modeled in and managed by the CMDB, are in compliance with a new resource rule that affect how the resource operates. In one embodiment, the computer-implementable method includes the step of, in response to detecting a rule change, transmitting a new rule to a rule control logic in a resource management database, wherein the rule change changes a rule for an attribute of a resource in a data processing system, and wherein the resource management database describes attributes of resources in the data processing system. The method may include the further step of transmitting the new rule from the rule control logic to a resource manager, wherein the resource manager is a person who has the capacity to implement the new rule in a resource in the data processing system

20 Claims, 8 Drawing Sheets

(51) Int. Cl.
*G06Q 50/18* (2012.01)
*H04L 29/06* (2006.01)

(56) References Cited

U.S. PATENT DOCUMENTS

| | | | | |
|---|---|---|---|---|
| 7,610,304 | B2* | 10/2009 | Jain et al. | 1/1 |
| 2002/0069367 | A1* | 6/2002 | Tindal et al. | 713/201 |
| 2002/0103575 | A1* | 8/2002 | Sugawara | 700/245 |
| 2004/0030923 | A1* | 2/2004 | Tindal et al. | 713/201 |
| 2004/0243699 | A1* | 12/2004 | Koclanes et al. | 709/224 |
| 2005/0102505 | A1* | 5/2005 | Chung et al. | 713/164 |
| 2006/0004875 | A1* | 1/2006 | Baron et al. | 707/200 |
| 2006/0015841 | A1* | 1/2006 | Bishop et al. | 717/102 |
| 2006/0143177 | A1* | 6/2006 | Idicula et al. | 707/8 |
| 2006/0161879 | A1* | 7/2006 | Lubrecht et al. | 717/101 |
| 2006/0277080 | A1* | 12/2006 | DeMartine et al. | 705/7 |
| 2006/0293942 | A1* | 12/2006 | Chaddha et al. | 705/8 |
| 2007/0005774 | A1* | 1/2007 | Singh et al. | 709/227 |
| 2007/0061191 | A1* | 3/2007 | Mehrotra et al. | 705/11 |
| 2007/0100892 | A1* | 5/2007 | Kephart et al. | 707/200 |
| 2007/0239700 | A1* | 10/2007 | Ramachandran | 707/5 |
| 2007/0288281 | A1* | 12/2007 | Gilbert et al. | 705/8 |
| 2007/0288925 | A1* | 12/2007 | Hughes et al. | 718/100 |

OTHER PUBLICATIONS

"Cendura Supports IBM's IT Service Management Solutions." Market Wire Incorporated, May 17, 2005.*
Scannell, Ed. "Tivoli Automates IT Processes." InfoWorld, vol. 27, No. 21, p. 23, May 23, 2005.*
Dubie, Denise. "IBM Introduces Configuration Mgmt. Software." Network World, vol. 22, No. 20, p. 29, May 23, 2005.*
U.S. Appl. No. 11/451,073—Decision on Appeal Mailed August 29, 2014.
U.S. Appl. No. 11/451,073, Non-Final Office Action Dated Mar. 31, 2010.
U.S. Appl. No. 11/451,073, Final Office Action Dated Mar. 17, 2011.

* cited by examiner

RULE MANAGEMENT USING A CONFIGURATION DATABASE

BACKGROUND OF THE INVENTION

The present invention relates in general to the field of computers and other data processing systems, including hardware, software and processes. More particularly, the present invention pertains to the management of the resources of a data processing system using rules and/or policies.

Enterprise behavior is governed by policies that, in some cases, are translated into rules for computing resources. For example, an enterprise may have an enterprise policy (e.g., a corporate policy) that dictates that passwords used by computer resources (including hardware and software) must be "strong" (difficult to bypass or "break"). Such a policy may translate into a "rule," such as a rule that "passwords must be eight characters in length."

In some software applications, such a rule is abstracted from software code in the software application. For example, an application might include a function call such as "checkPasswordStrength( )". In a case such as this, the function call can invoke a rules engine, which makes adopting policy-based changes easier. Thus, if the password-strength requirement went from six characters to eight characters, applications using this strategy would only have to change one rule (e.g., changing "if (length>6)" to "if (length>8)").

Unfortunately, the scenario described above rarely exists consistently in the real world. That is, in an ideal world, every enterprise resource (e.g., software applications, hardware, etc) would have a variable or a call routine that would go to a central repository to obtain a current value (e.g., password length must be <eight> characters). However, many applications are hard coded, are overridden by a configuration parameter set by an administrator, are governed by another rule system, etc. For example, a line of code may be hard coded as "password length must be six characters" instead of soft coded as "password length must be <VARIABLE> characters." When a system rule changes from requiring six characters to requiring eight characters for a password, verifying that each and every hard coded application complies with this rule change can be difficult if not unreasonable impractical. If compliance with the rule change is mandatory, such as a requirement to be compliant with an industry standard, a governmental regulation, or a law, failing to amend the hard coding can have serious consequences.

SUMMARY OF THE INVENTION

To address the problem described above, a Configuration Management DataBase (CMDB) is utilized when determining if resources, which are modeled in and managed by the CMDB, are in compliance with a newly implemented resource rule. Thus, in one embodiment of a computer-implementable method, system and computer-usable medium, the computer-implementable method includes the step of, in response to detecting a rule change, transmitting a new rule to a rule control logic in a resource management database, wherein the rule change changes a rule for an attribute of a resource in a data processing system, and wherein the resource management database describes attributes of resources in the data processing system.

The method may include the further step of transmitting the new rule from the rule control logic to a resource manager, wherein the resource manager is a person who has the capacity to implement the new rule in a resource in the data processing system. In embodiment in which the resource management database is a Configuration Management Database (CMDB), the computer-implementable method may include the additional step of transmitting a watch message from the rule control logic to a Configuration Item (CI) in a CMDB, wherein the CI contains a shadow copy of attribute configurations for resources managed by the CMDB, and wherein the watch message instructs the CI to watch for a certification entry from the resource manager, and wherein the certification entry identifies the resource as being in compliance with the new rule.

Furthermore, the computer-implementable method may include the steps of: in response to the resource manager implementing the new rule in the resource, receiving a certification entry in the CI indicating that the resource is in compliance with the new rule; transmitting a certification message from the CI to a certification control in the CMDB, wherein the certification message indicates that the resource is in compliance with the new rule; and transmitting a compliance summary from the certification control to an enterprise's Information Systems (IS) manager, wherein the compliance summary describes a compliance status for multiple resources in the data processing system, and wherein the compliance status describes whether a resource has or has not implemented the new rule.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

In the present invention, a Configuration Management Database (CMDB) is a unified repository of information. An exemplary CMDB, as modified by and used in the present invention, is also capable of storing other data such as rules and policies related to all resources in an Information System (IS). As such, the CMDB allows an enterprise to understand relationships between resources (including both IS hardware and software) and to track their configuration. Included in the CMDB are Configuration Items (CI) and details about relationships between CIs. A CI is defined as an instance of a resource that has configurable attributes, such as hardware resources (e.g., storage devices, servers, routers, etc.) as well as software resources (applications, databases, etc.).

Thus, as described herein, the present invention extends the CMDB to include fields such that each resource has a list of rules that are enforced by the enterprise. In one embodiment, this enforcement is performed by the CMDB. Dependencies between a rule and a corporate policy may be stored within or outside the CMDB. When a change in a "policy" (i.e., a high-level rule) or other change (e.g., a change to the technological requirements and/or abilities of an enterprises data processing system) is made, a CMDB linked list (found in a rule control logic) of CI rules is traversed to find all resources that are or should be implementing the new rule. Owners of those resources are (preferably automatically) asked to certify that the resources comply with the new (changed) rule, preferably within a specified period of time. After the specified period of time, tracked non-compliant resources are marked as out-of-compliance, and reported as such to the enterprise's Information Systems (IS) manager. Indicators of compliance and/or non-compliance can be stored as a CMDB Configuration Item in a certification control database in the CMDB. Alternatively, compliance tracking information may be performed by directly monitoring certification entries in the CI's.

Figure 1:
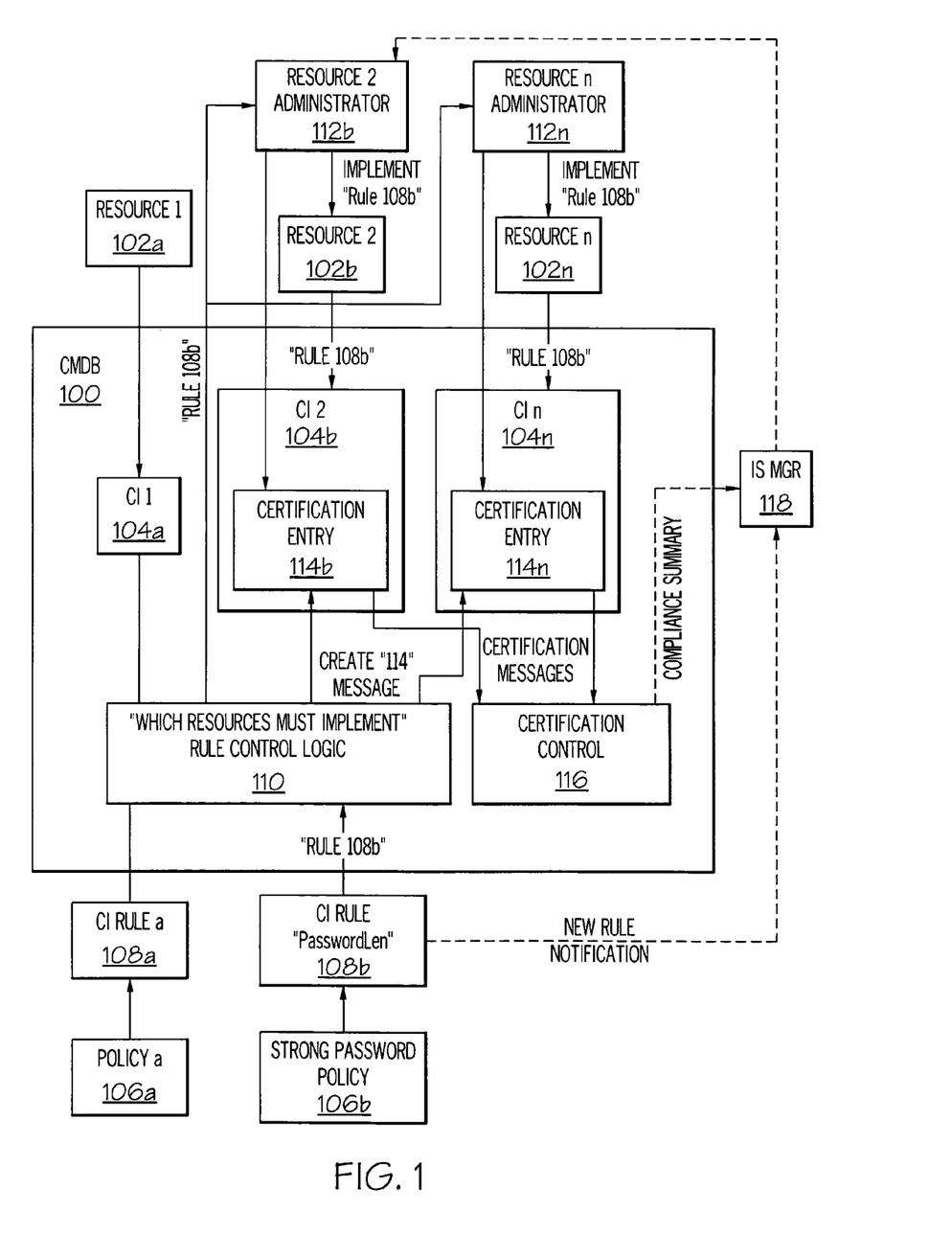
FIG. 1 depicts an exemplary Configuration Management Database (CMDB) contemplated for use by the present invention.

With reference now to the figures, and in particular to FIG. 1, an exemplary Configuration Management Database (CMDB) 100, having novel modifications that are contemplated by the present invention, is presented. CMDB 100 manages multiple resources 102a-n, which are software and hardware computer resources in an enterprise's data processing system, which may be a network (virtual or actual), a stand-alone computer, or any other Information Technology (IT) environment. Each resource 102 has a corresponding Configuration Item (CI) 104a-n, each of which provides a description of attributes of a particular resource 102. These attributes include, but are not limited to, security requirements, addresses, and other configuration items for a particular resource.

Consider now, for exemplary purposes, a resource attribute that is related to how long a password should be for a user to access that resource. This resource attribute is described by a CI rule 108. There may be multiple CI rules 108, including the shown CI rules 108a-b. Each CI rule may be linked to a policy 106, such as the depicted policies 106a-b. For example, assume that CI rule 108b is a rule for a minimum password length ("PasswordLen"). This rule may be changed in response to a change in an enterprise policy 106b, which states that certain or all resources 102 in the enterprise must have a "Strong Password" to permit access to that resource. Note that policy 106 is merely an enterprise directive, while CI rule 108 creates an actual rule that can be understood by a resource and/or the CMDB 100.

Continuing with FIG. 1, a CI rule 108 may be passed to a rule control logic 110, which controls, inter alia, which resources 102 must implement a particular CI rule 108. For example, rule control logic 110 may determine (e.g., via a lookup table or a linked list contained within rule control logic 110), that Resource 2 (102b) and Resource n (102n) must both implement CI rule 108b, which requires a resource to use a password of a particular length (e.g., six characters). Upon notification that a CI rule 108 has changed (resulting in a new rule), rule control logic 110 performs two operations: 1) rule control logic 110 sends a notification to a resource administrator 112 of the new rule; and 2) rule control logic 110 creates a certification entry 114 in appropriate CI's 104. For example, assume that CI rule 108b represents a new rule requiring longer (e.g., eight characters) passwords to be used by a resource 102. If the affected resources are Resource 2 (102b) and Resource n (102n), then rule control logic 110 sends a message to a Resource 2 administrator (112b) and a Resource n administrator (112n) informing these persons that the respective resources 102 under their management need to implement the new CI rule 108b. These resource administrators 112 implement the new CI rule 108b in their respective resources 102, and also set a flag or other setting in the respective certification entry 114 (114b and 114n in the present example) in a corresponding CI 104 (i.e., 104b and 104n) that the new rule has been implemented, thus certifying the particular resource 102 as being in compliance with the new CI rule 108b. To provide a central repository of which resources 102 are compliant with new rules 108, the information in the certification entries 114 (including the compliance status described above) may be stored in a certification control 116. The certification control 116 may send an enterprise's IS manager 118 a compliance summary describing the implementation status of new rules 108 in various resources 102. Note that the IS manager 118 may have been forewarned (to watch for these compliances) by sending the new CI rule 108b to the IS manager 118 at or near the time that the new CI rule 108b was sent to the rule control logic 110 and beyond.

Figure 2:
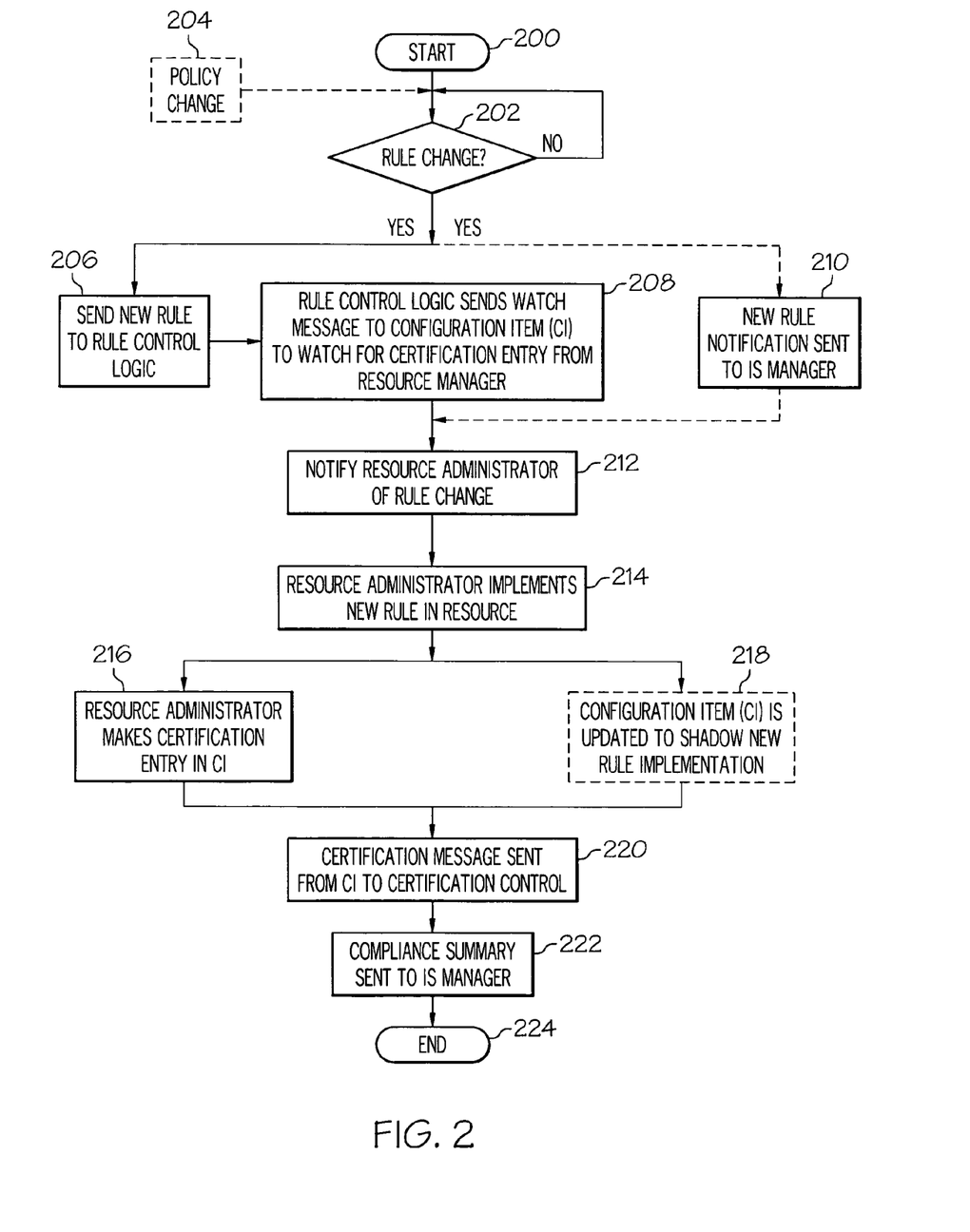
FIG. 2 is a flow-chart showing exemplary steps taken in the present invention to determine if enterprise resources are in compliance with one or more CI rules and/or their associated enterprise policies.

With reference now to FIG. 2, a flow-chart describing the steps reference in FIG. 1 (whose components are again reference herein) is presented. After initiator block 200, a query is made (query block 202) to determine if a CI rule has changed, resulting in a new rule for an attribute of a resource. This rule change may have been the result of a change (block 204) to an enterprise policy 106, as described in FIG. 1. If a CI rule has changed, then the new rule is sent to the rule control logic 110 (block 206), which sends a message (i.e., creates a certification entry 114) to a CI 104 that instructs the CI 104 to watch for a certification message from a resource manager that a resource associated with that CI has implemented the new rule (block 208). Optionally, a new rule notification may be sent to an Information Systems (IS) manager, forewarning the IS manager that a new rule needs to be implemented in one or more resources (block 210).

As described at block 212, the appropriate resource manager is notified of the new CI rule. The resource manager implements the new rule in the appropriate resource (block 214), and makes a certification entry in that resource's CI indicating that the new rule has been implemented, and thus that resource is in compliance with the new rule (block 216). Note that besides setting an appropriate flag in the certification entry (as described in block 216), the rest of the CI is also updated (block 218) to reflect (shadow) the updated configuration of the resource. A certification message is sent from the appropriate certification entry 114 (in the CI 104) to the certification control 116. The certification control 116 may send a compliance summary, of the compliance status of some or all enterprise resources, to the enterprise's IS manager (block 222). The process thus ends at terminator block 224.

Figure 3:
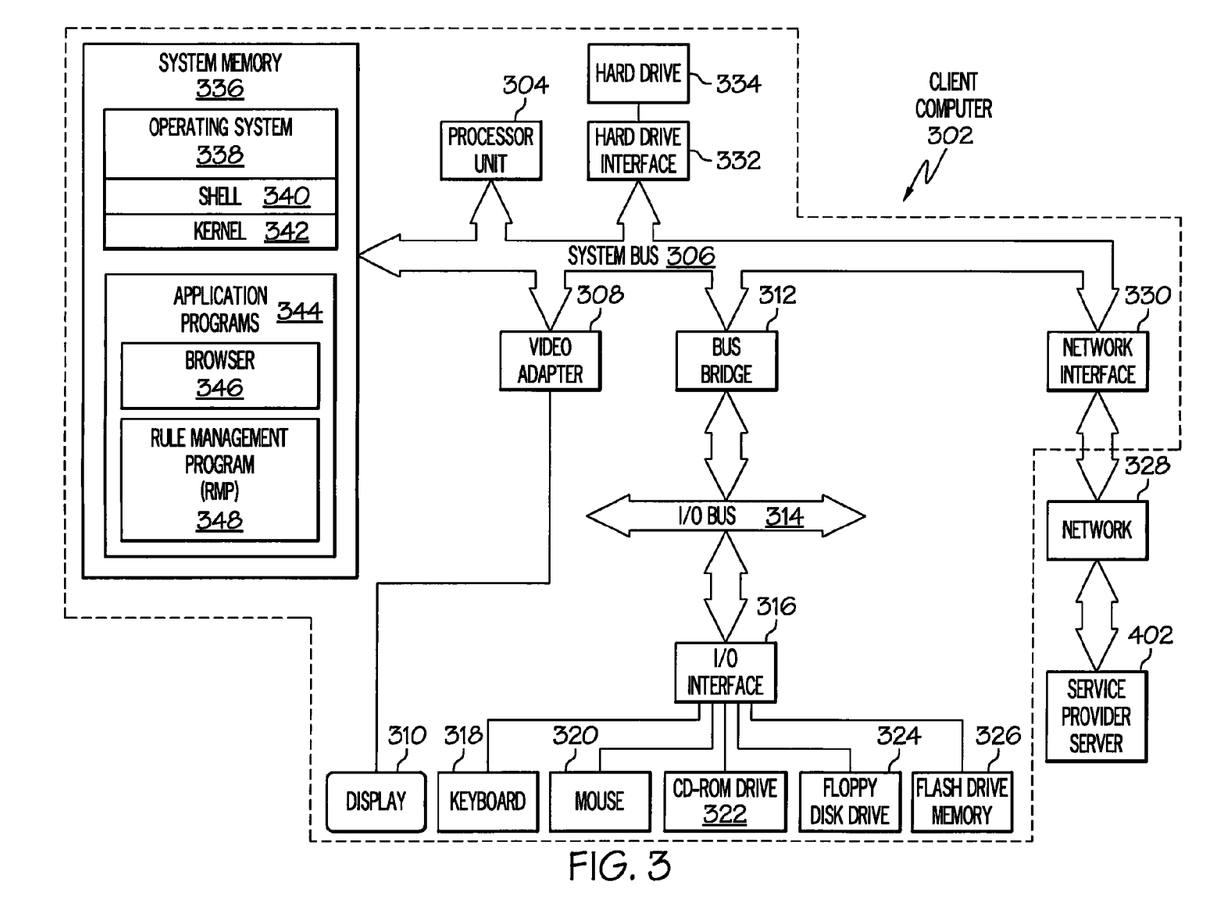
FIG. 3 depicts an exemplary client computer in which the present invention may be implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Figure 4:
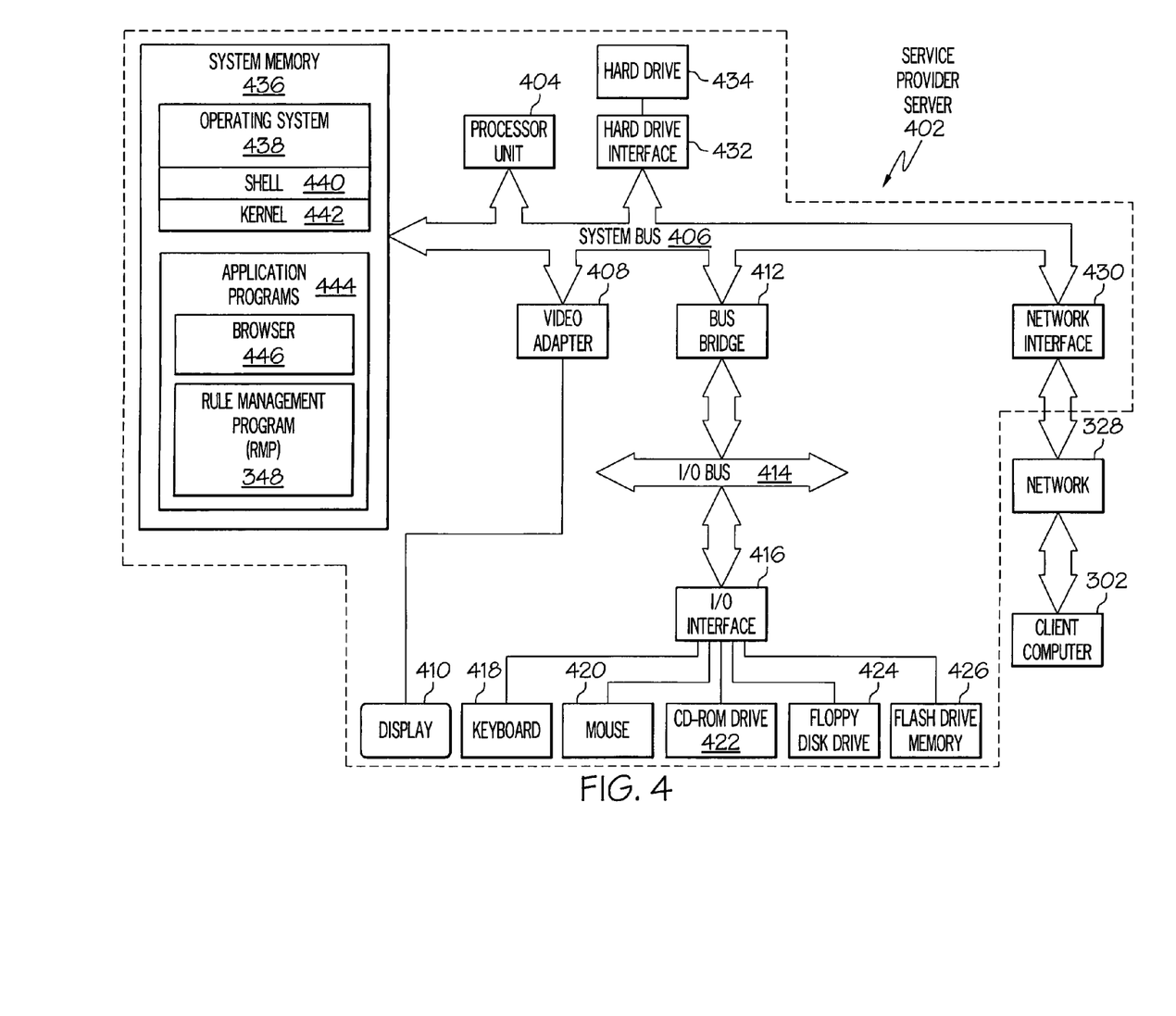
FIG. 4 illustrates an exemplary server from which software for executing the present invention may be deployed and/or implemented for the benefit of a user of the client computer shown in FIG. 3.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN). Using network 328, client computer 302 is able to use the present invention to access service provider server 402.

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a Rule Management Program (RMP) 348, which includes code for implementing the processes described in FIGS. 1-2. In one embodiment, client computer 302 is able to download RMP 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

As noted above, RMP 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known by those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to execute and/or download RMP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of RMP 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of RMP 348), thus freeing client computer 302 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of RMP 348, are performed by service provider server 402. Alternatively, RMP 348 and the method described herein, and in particular as shown and described in FIGS. 1-2, can be deployed as a process software from service provider server 402 to client computer 302. Still more particularly, process software for the method so described may be deployed to service provider server 402 by another service provider server (not shown).

Figure 5A:
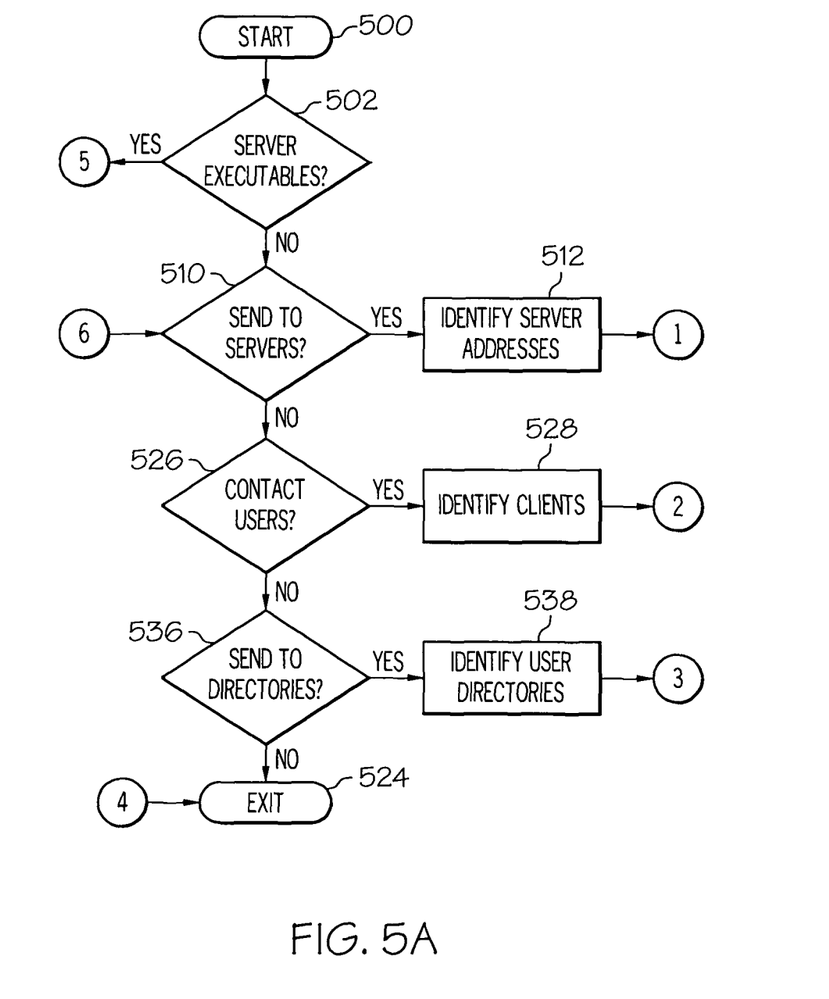
FIGS. 5a-b show a flow-chart of steps taken to deploy software capable of executing the steps shown and described in FIGS. 1-2.
Figure 5B:
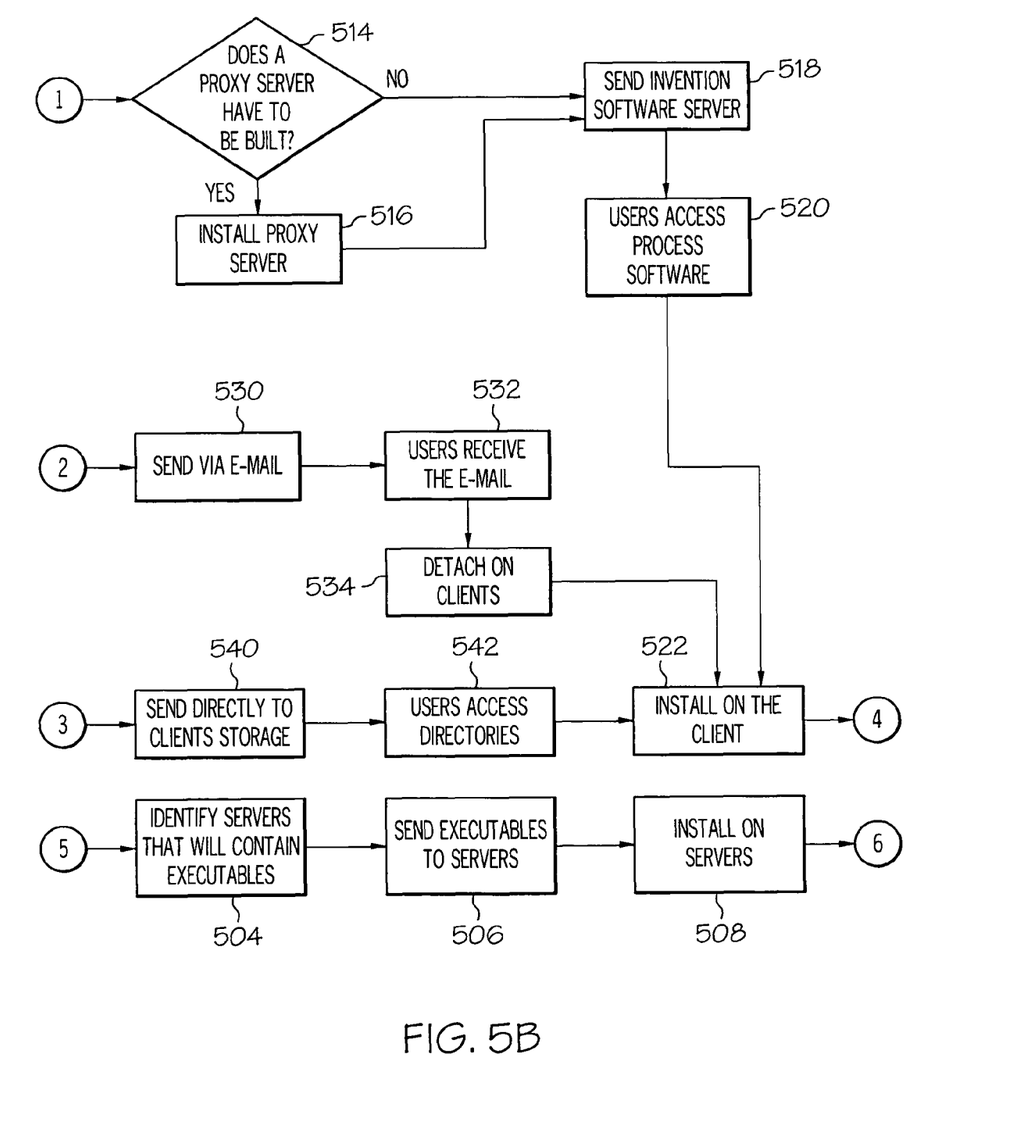

Referring then to FIGS. 5*a-b*, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made as to whether the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
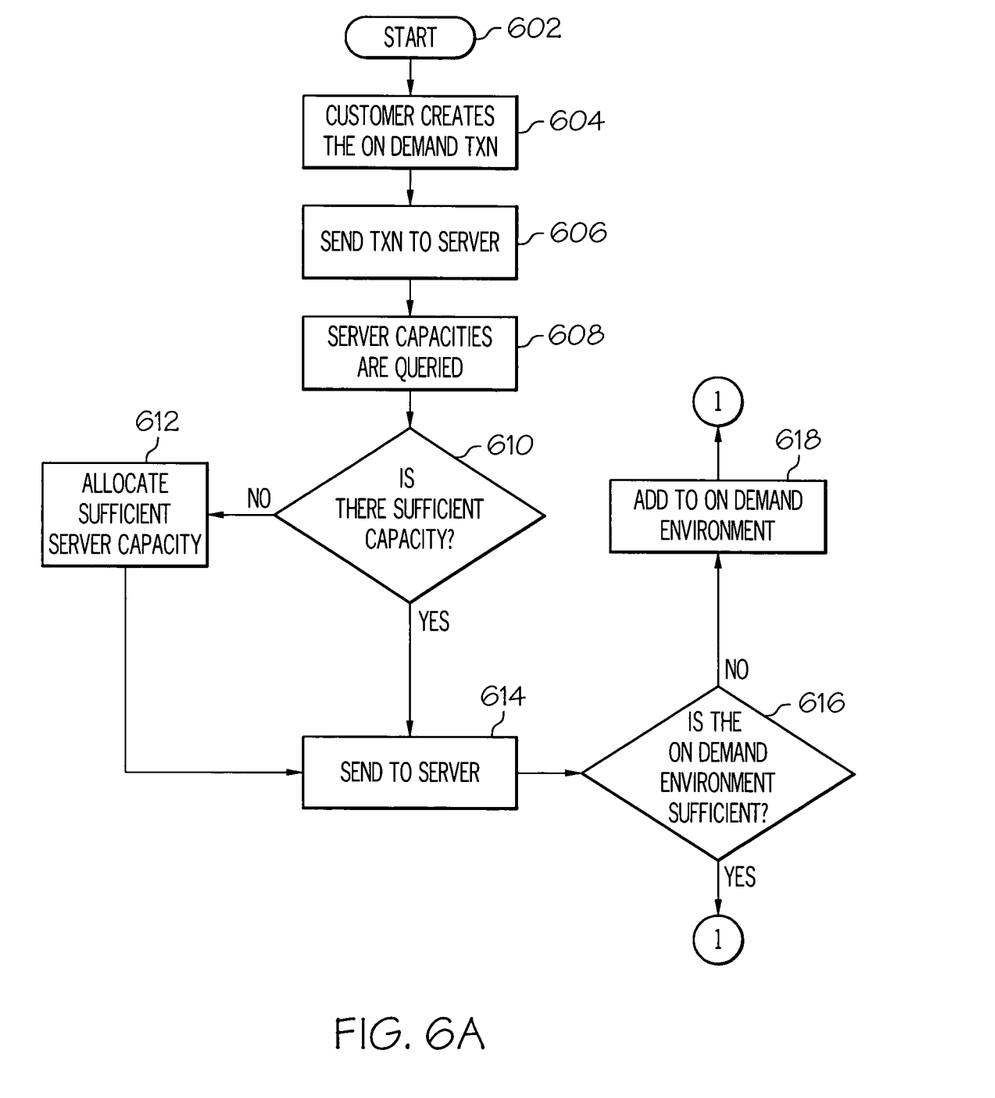
FIGS. 6a-b show a flow-chart showing steps taken to execute the steps shown and described in FIGS. 1-2 using an on-demand service provider.
Figure 6B:
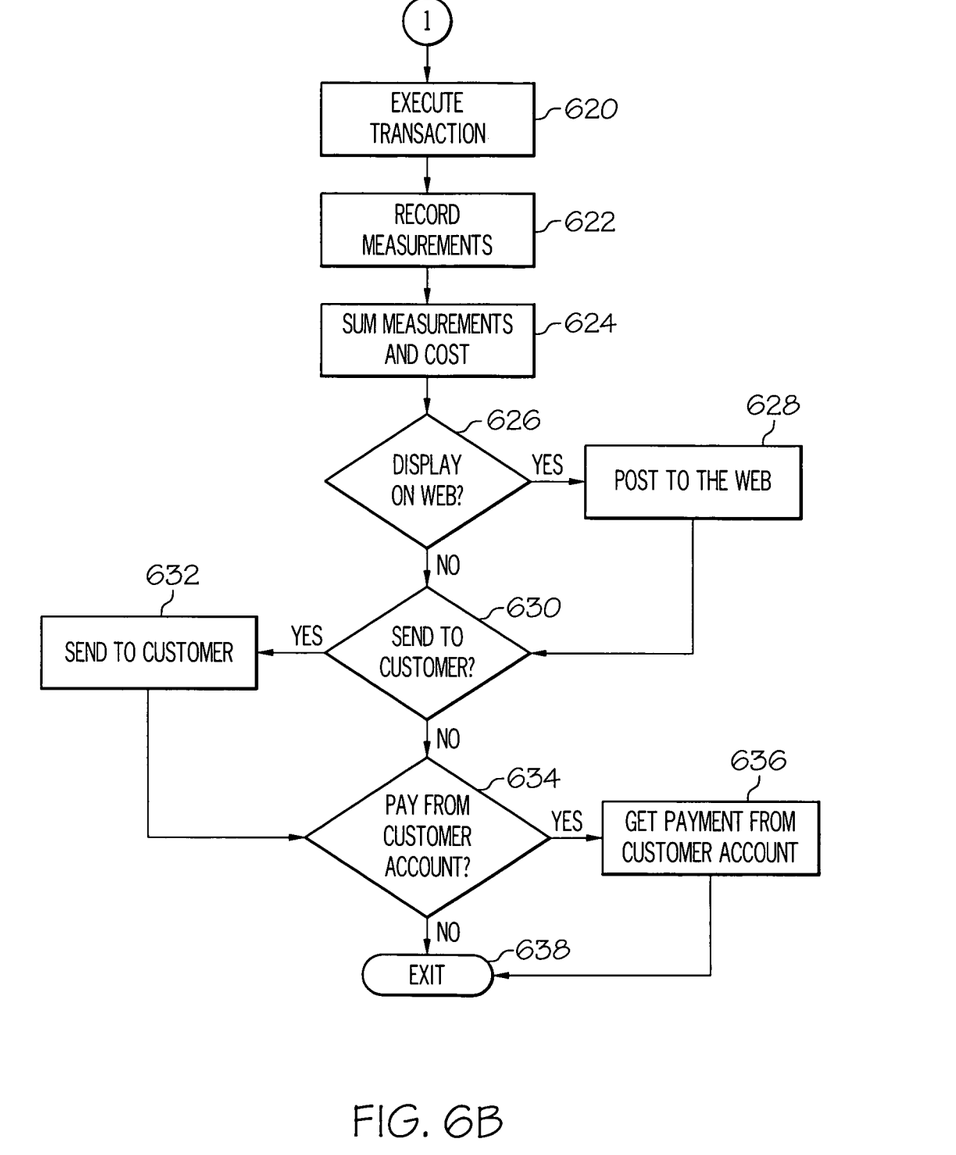

With reference now to FIGS. 6a-b, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

The present invention thus provides for a computer-implementable method, system and computer-usable medium for managing rules through the use of a configuration database. In one embodiment, the computer-implementable method includes the step of, in response to detecting a rule change, transmitting a new rule to a rule control logic in a resource management database, wherein the rule change changes a rule for an attribute of a resource in a data processing system, and wherein the resource management database describes attributes of resources in the data processing system. The method may include the further step of transmitting the new rule from the rule control logic to a resource manager, wherein the resource manager is a person who has the capacity to implement the new rule in a resource in the data processing system. In embodiment in which the resource management database is a Configuration Management Database (CMDB), the computer-implementable method may include the additional step of transmitting a watch message from the rule control logic to a Configuration Item (CI) in a CMDB, wherein the CI contains a shadow copy of attribute configurations for resources managed by the CMDB, and wherein the watch message instructs the CI to watch for a certification entry from the resource manager, and wherein the certification entry identifies the resource as being in compliance with the new rule. Furthermore, the computer-implementable method may include the steps of: in response to the resource manager implementing the new rule in the resource, receiving a certification entry in the CI indicating that the resource is in compliance with the new rule; transmitting a certification message from the CI to a certification control in the CMDB, wherein the certification message indicates that the resource is in compliance with the new rule; and transmitting a compliance summary from the certification control to a CMDB manager, wherein the compliance summary describes a compliance status for multiple resources in the data processing system, and wherein the compliance status describes whether a resource has or has not implemented the new rule.

Note further that, as described above, instructions used in each embodiment of a computer-usable medium may be deployed from a service provider to a user. This deployment may be made in an "on-demand" basis as described herein.

While the present invention has been particularly shown and described with reference to a preferred embodiment, it will be understood by those skilled in the art that various changes in form and detail may be made therein without departing from the spirit and scope of the invention. For example, while the invention has been described as creating a new rule in response to a change to a CI rule and/or an enterprise's policy (as defined above), it should be understood that the new rule may be initially created in response to a change to an enterprise's policy or to a creation of a new enterprise policy. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method of managing resources in a data processing system, the computer implemented method comprising:
   a processor unit, in response to detecting a rule change, transmitting a new rule to a rule control logic in a resource management database, wherein the resource management database is a Configuration Management Database (CMDB), wherein the rule change changes a rule for an attribute of a resource in a data processing system, and wherein the resource management database describes attributes of resources in the data processing system;
   the processor unit transmitting the new rule from the rule control logic to a resource manager, wherein the new rule instructs the resource manager to implement the new rule in a resource in the data processing system;
   the processor unit transmitting a watch message from the rule control logic to a Configuration Item (CI) in a CMDB, wherein the CI contains a shadow copy of attribute configurations for resources managed by the CMDB, and wherein the watch message instructs the CI to watch for a certification entry from the resource manager, and wherein the certification entry identifies the resource as being in compliance with the new rule;
   the processor unit transmitting a certification message from the CI to a certification control in the CMDB, wherein the certification message indicates whether the resource is in compliance with the new rule; and
   the processor unit transmitting a compliance summary from the certification control to an enterprise Information Systems (IS) manager, wherein the compliance summary describes a compliance status for multiple resources in the data processing system, and wherein the compliance status describes whether a resource has or has not implemented the new rule.

2. The computer implemented method of claim 1, wherein the new rule is created in response to a creation of a new enterprise policy for the resource, wherein the new enterprise policy is an enterprise directive from which the new rule is derived, and wherein the new rule creates software code that is executed by the resource to implement the new enterprise policy and the new rule on the resource.

3. The computer implemented method of claim 1, wherein the rule control logic controls which resources in a networked system of computers implement the new rule.

4. The computer implemented method of claim 1, wherein each resource has a separate CI that describes attributes of said each resource.

5. The computer implemented method of claim 1, further comprising:
   the processor unit transmitting a forewarning to the enterprise (IS) manager, wherein the forewarning is a notice that the new rule is being sent to the resource manager.

6. The computer implemented method of claim 1, further comprising:
   the processor unit tracking the resource to determine if the new rule has been implemented within a specified period of time;
   the processor unit, in response to the resource manager implementing the new rule in the resource within the specified period of time, transmitting a certification entry to the CI indicating that the resource is in compliance with the new rule; and
   the processor unit, in response to the resource manager failing to implement the new rule in the resource within the specified period of time, marking the resource as out-of-compliance and reporting said out-of-compliance to the enterprise IS manager.

7. The computer implemented method of claim 1, wherein each resource in the data processing system has an associated list of rules that are enforced by the CMDB.

8. A system comprising:
   a processor;
   a data bus coupled to the processor;
   a memory coupled to the data bus; and
   a non-transitory computer-usable medium embodying computer program code, the computer program code comprising instructions executable by the processor and configured for:
   in response to detecting a rule change, transmitting a new rule to a rule control logic in a resource management database, wherein the resource management database is a Configuration Management Database (CMDB), wherein the rule change changes a rule for an attribute of a resource in a data processing system, and wherein the resource management database describes attributes of resources in the data processing system;

transmitting the new rule from the rule control logic to a resource manager, wherein the new rule instructs the resource manager to implement the new rule in a resource in the data processing system;

transmitting a watch message from the rule control logic to a Configuration Item (CI) in a CMDB, wherein the CI contains a shadow copy of attribute configurations for resources managed by the CMDB, and wherein the watch message instructs the CI to watch for a certification entry from the resource manager, and wherein the certification entry identifies the resource as being in compliance with the new rule;

transmitting a certification message from the CI to a certification control in the CMDB, wherein the certification message indicates whether the resource is in compliance with the new rule; and transmitting a compliance summary. from the certification control to an enterprise Information Systems (IS) manager, wherein the compliance summary describes a compliance status for multiple resources in the data processing system, and wherein the compliance status describes whether a resource has or has not implemented the new rule.

9. The system of claim 8, wherein the new rule is created in response to a creation of a new enterprise policy for the resource wherein the new enterprise policy is an enterprise directive from which the new rule is derived, and wherein the new rule creates software code that is executed by the resource to implement the new enterprise policy and the new rule on the resource.

10. The system of claim 7, wherein the rule control logic controls which resources in a networked system of computers implement the new rule.

11. The system of claim 7, wherein each resource has a separate Cl that describes attributes of said each resource.

12. The system of claim 8, wherein the instructions are further configured for:

transmitting a forewarning to the enterprise (IS) manager, wherein the forewarning is a notice that the new rule is being sent to the resource manager.

13. The system of claim 8, wherein the instructions are further configured for:

tracking the resource to determine if the new rule has been implemented within a specified period of time;

in response to the resource manager implementing the new rule in the resource within the specified period of time, transmitting a certification entry to the CI indicating that the resource is in compliance with the new rule; and in response to the resource manager failing to implement the new rule in the resource within the specified period of time, marking the resource as out-of-compliance and reporting said out-of-compliance to the enterprise IS manager.

14. The system of claim 8, wherein each resource in the data processing system has an associated list of rules that are enforced by the CMDB.

15. A non-transitory computer readable storage device embodying computer program code, the computer program code comprising computer executable instructions configured for:

in response to detecting a rule change, transmitting a new rule to a rule control logic in a resource management database, wherein the resource management database is a Configuration Management Database (CMDB), wherein the rule change changes a rule for an attribute of a resource in a data processing system, and wherein the resource management database describes attributes of resources in the data processing system;

transmitting the new rule from the rule control logic to a resource manager, wherein the new rule instructs the resource manager to implement the new rule in a resource in the data processing system;

transmitting a watch message from the rule control logic to a Configuration Item (CI) in a CMDB, wherein the CI contains a shadow copy of attribute configurations for resources managed by the CMDB, and wherein the watch message instructs the CI to watch for a certification entry from the resource manager, and wherein the certification entry identifies the resource as being in compliance with the new rule;

transmitting a certification message from the CI to a certification control in the CMDB, wherein the certification message indicates whether the resource is in compliance with the new rule; and transmitting a compliance summary from the certification control to an enterprise Information Systems (IS) manager, wherein the compliance summary describes a compliance status for multiple resources in the data processing system, and wherein the compliance status describes whether a resource has or has not implemented the new rule, and wherein the computer executable instructions are deployable to a client computer from a server at a remote location in an on-demand basis.

16. The computer readable storage device of claim 15, wherein the new rule is created in response to a creation of a new enterprise policy for the resource, wherein the new enterprise policy is an enterprise directive from which the new rule is derived, and wherein the new rule creates software code that is executed by the resource to implement the new enterprise policy and the new rule on the resource.

17. The computer readable storage device of claim 15, wherein the rule control logic controls which resources in a networked system of computers implement the new rule.

18. The computer readable storage device of claim 15, wherein each resource has a separate CI that describes attributes of said each resource.

19. The computer readable storage device of claim 15, wherein the computer executable instructions are further configured for:

transmitting a forewarning to the enterprise (IS) manager, wherein the forewarning is a notice that the new rule is being sent to the resource manager.

20. The computer readable storage device of claim 15, wherein the computer executable instructions are further configured for:

tracking the resource to determine if the new rule has been implemented within a specified period of time;

in response to the resource manager implementing the new rule in the resource within the specified period of time, transmitting a certification entry to the CI indicating that the resource is in compliance with the new rule; and in response to the resource manager failing to implement the new rule in the resource within the specified period of time, marking the resource as out-of-compliance and reporting said out-of-compliance to the enterprise IS manager.

* * * * *